(12) United States Patent
Li et al.

(10) Patent No.: US 12,506,824 B2
(45) Date of Patent: Dec. 23, 2025

(54) ELECTRONIC DEVICE WITH CAMERA ASSEMBLY

(71) Applicant: Honor Device Co., Ltd., Shenzhen (CN)

(72) Inventors: Tuo Li, Shenzhen (CN); Kai Liu, Shenzhen (CN); Baogang Ren, Shenzhen (CN); Pan Wu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 667 days.

(21) Appl. No.: 17/800,826

(22) PCT Filed: Apr. 25, 2022

(86) PCT No.: PCT/CN2022/088935
§ 371 (c)(1),
(2) Date: Aug. 18, 2022

(87) PCT Pub. No.: WO2022/237515
PCT Pub. Date: Nov. 17, 2022

(65) Prior Publication Data
US 2024/0297930 A1    Sep. 5, 2024

(30) Foreign Application Priority Data

May 14, 2021    (CN) .......................... 202110530356.6
May 31, 2021    (CN) .......................... 202110598032.6

(51) Int. Cl.
*H04M 1/02*    (2006.01)
(52) U.S. Cl.
CPC ....... *H04M 1/0264* (2013.01); *H04M 1/0262* (2013.01); *H04M 2250/52* (2013.01)

(58) Field of Classification Search
CPC ............ H04M 1/0264; H04M 1/0262; H04M 2250/52; H04M 1/0274
See application file for complete search history.

(56) References Cited

U.S. PATENT DOCUMENTS 11,265,451  B2 *   3/2022   Yang ...................... H04N 23/57
2011/0177712  A1 *  7/2011   Tu ......................... H04N 23/54
                                                              439/366
(Continued)

FOREIGN PATENT DOCUMENTS

CN    204795180 U    11/2015
CN    105812639 A     7/2016
(Continued)

*Primary Examiner* — Allen L Parker
*Assistant Examiner* — Keon Kim
(74) *Attorney, Agent, or Firm* — Leydig, Voit & Mayer, Ltd.

(57) ABSTRACT

An electronic device includes a main support, a first steel sheet, a camera assembly, and a fixation assembly, where the main support is provided with a mounting space, with a first face and a second face that are opposite each other. The first steel sheet is mounted to the first face of the main support and provided with a mounting portion located inside the mounting space. The camera assembly is mounted in the mounting portion, and a fixation assembly is mounted to the second face of the main support to fix the camera assembly in the mounting portion, where a gap is left between the mounting portion and the first face of the main support. The disclosed electronic device can increase space of a downside region of a mainboard, so as to satisfy the need of mounting of components.

17 Claims, 7 Drawing Sheets

(56) References Cited

U.S. PATENT DOCUMENTS

| | | | |
|---|---|---|---|
| 2013/0039642 A1* | 2/2013 | Wang | H04M 1/0264 |
| | | | 396/535 |
| 2018/0176426 A1* | 6/2018 | Wei | A61B 3/154 |
| 2018/0249059 A1* | 8/2018 | Jeong | H04N 23/71 |
| 2019/0013605 A1 | 1/2019 | Cheng et al. | |
| 2019/0141172 A1 | 5/2019 | Chen | |

FOREIGN PATENT DOCUMENTS

| | | | | |
|---|---|---|---|---|
| CN | 107454231 A | | 12/2017 | |
| CN | 107528946 A | | 12/2017 | |
| CN | 209056699 U | | 7/2019 | |
| CN | 110636190 A | | 12/2019 | |
| CN | 112187970 A | * | 1/2021 | H04N 23/50 |
| CN | 112736518 A | | 4/2021 | |
| CN | 113794790 A | | 12/2021 | |
| IN | 107105573 A | | 8/2017 | |

\* cited by examiner

ELECTRONIC DEVICE WITH CAMERA ASSEMBLY

CROSS-REFERENCE TO RELATED APPLICATIONS

This application is a National Stage of International Application No. PCT/CN2022/088935, filed on Apr. 25, 2022, which claims priority to Chinese Patent Application No. 202110530356.6, filed on May 14, 2021, and Chinese Patent Application No. 202110598032.6, filed on May 31, 2021. The disclosures of each of the aforementioned applications are hereby incorporated by reference in their entireties.

TECHNICAL FIELD

This application relates to the field of terminal technologies, and in particular, to an electronic device.

BACKGROUND

With rapid development of the mobile phone industry, pixels, battery capacity and charging speeds of mobile phones have been the focus of attention of recent years. Mobile phone manufacturers have also launched mobile phones with high charging speeds and high pixels.

At present, to improve photographing performance of mobile phones, the number of cameras provided in a mobile phone is constantly increased, so that the cameras of the mobile phone form a module. However, the increase of cameras may impose increasingly high requirements on technologies of interior structures of mobile phones for the provision of multiple cameras. In addition, to improve charging speeds of mobile phones, a 2-cell solution is generally used such that a battery has two board-to-board connectors (BTB connectors) which are both disposed at a lower end of a mainboard. This results in shortage of space in a downside region of the mainboard, so that the need of mounting of components cannot be satisfied.

Therefore, it is in urgent need to provide a device which can satisfy requirements of both photographing and mounting of fast-charging components.

SUMMARY

This application provides an electronic device. Without reduction of cameras, space of a downside region of a mainboard can be increased to satisfy the need of mounting of fast-charging components.

This application provides an electronic device. The electronic device includes a main support, a first steel sheet, a camera assembly, and a fixation assembly, where the main support is provided with a mounting space, and the main support is provided with a first face and a second face that are opposite each other. The first steel sheet is mounted to the first face of the main support and provided with a mounting portion located inside the mounting space. The camera assembly is mounted in the mounting portion, and the fixation assembly is mounted to the second face of the main support to fix the camera assembly in the mounting portion, where a gap is left between the mounting portion and the first face of the main support. Provision of the gap can increase longitudinal space of the electronic device. During specific disposition of components, an additional board-to-board connector can be mounted in the gap to satisfy the need of mounting of components. With such design, it is only necessary to extend the camera assembly outwards for some distance without the need to increase transverse space of the electronic device.

In an embodiment, the first steel sheet may include a first steel sheet body, a bearing piece, and a first connection piece, where both the first steel sheet body and the first connection piece are connected to a first face of a main support. The first steel sheet body and the first connection piece are located at two sides of a mounting space. Two ends of the bearing piece are connected to the first connection piece and the first steel sheet body, respectively, and the bearing piece protrudes away from the first face of the main support, so that a gap is left between the bearing piece and a plane on which the first face of the main support is located, and this gap may be used for mounting a board-to-board connector.

It should be noted that, to increase convenience of disposition of components, the bearing piece may be disposed close to a part of the electronic device where a battery is mounted, so that the board-to-board connector fitting with the battery can be more conveniently mounted in the gap.

In an embodiment, the bearing piece may be provided with a first limit plate and a second limit plate, where the first limit plate and the second limit plate may extend towards the second face of the main support and inhibit movement of the camera assembly in a first direction and a second direction. In addition, to make the camera assembly more securely mounted, the first limit plate and/or the second limit plate may be provided with a folded edge. Provision of the folded edge can inhibit movement of the camera assembly in a third direction. The bearing piece, the first limit plate, the second limit plate, and the folded edge that is provided on the first limit plate and/or the second limit plate together form the mounting portion. While accommodating the camera assembly, the mounting portion can also limit movement of the camera assembly, so as to initially define a position of the camera assembly.

In the foregoing embodiments, the camera assembly may include a camera and an elastic connection piece, where the elastic connection piece is provided with a first end and a second end. The camera is mounted at the first end of the elastic connection piece. A first connector is disposed at the second end of the elastic connection piece. The first connector faces the second face of the main support, and may be connected to the fixation assembly.

In an embodiment, to fix and connect the foregoing camera assembly, the fixation assembly may include an adapting circuit board and a second steel sheet, where a first end of the adapting circuit board is disposed on a second face of the main support, and the first end of the adapting circuit board is located between the second face of the main support and the second end of the elastic connection piece. A second connector fitting with the first connector is disposed at a side facing the elastic connection piece of the first end of the adapting circuit board, thereby guaranteeing steady running of the camera disposed at the first end of the elastic connection piece. In addition, a board-to-board connector connected to a mainboard may also be disposed at a second end of the adapting circuit board.

To conveniently mount the adapting circuit board to the main support, a plurality of positioning posts may be disposed on the main support, and through holes may be provided in the adapting circuit board and located at two sides of the adapting circuit board, where the positioning posts on the main support run through the through holes, so as to define a position of the adapting circuit board and prevent the adapting circuit board from joggling.

In the foregoing embodiment, the second steel sheet may include a second steel sheet body and a limit piece, where the limit piece is disposed at a side of the second steel sheet body facing the camera, and the limit piece may abut against the camera, so as to fix the position of the camera in the mounting portion and prevent the camera from joggling in the mounting portion.

Specifically, the limit piece may include a plugging portion and an abutting portion. One end of the abutting portion is connected to a side of the second steel sheet body facing the camera, and the other end of the abutting portion is connected to the plugging portion. The plugging portion may be perpendicular to the abutting portion. The plugging portion may be plugged below the camera, or a socket fitting with the plugging portion is provided in the camera, so that the abutting portion is able to abut against the camera, making the camera unable to move in a direction reverse to the first direction.

In a specific implementation, a first end of the second steel sheet body and a second end of the adapting circuit board are pressed together, and a second end of the second steel sheet body and the second end of the elastic connection piece may be pressed together, thereby ensuring that the camera is unable to joggle after being mounted. In addition, to make the second steel sheet body securely mounted to the main support after the adapting circuit board and the elastic connection piece are pressed together with the second steel sheet body, a positioning piece may be disposed at both the first end and the second end of the second steel sheet body, and a first positioning hole may be provided in each positioning piece. The main support is provided with second positioning holes that fit with the first positioning holes. The second steel sheet body is fixed to the main support by a screw or a rivet, so as to lock the camera assembly.

It should be noted that there may be two positioning pieces disposed at the first end of the second steel sheet body, and the two positioning pieces located at the first end are disposed at two sides of the second steel sheet body, so as to secure the connection of the first end of the second steel sheet body to the main support. In addition, there may be one positioning piece disposed at the second end of the second steel sheet body, and the one positioning piece is disposed at a side away from the camera. With the one positioning piece and the limit piece, the second end of the second steel sheet body can be secured to the main support.

To make the second steel sheet body more securely mounted to the main support, a positioning plate may be disposed on an end face of the second end of the second steel sheet body, with an opening provided in the positioning plate, where the positioning plate may be a flexible plate able to rotate relative to the second steel sheet body. A positioning member fitting with the opening is disposed on a side face of the main support. When the second steel sheet body is being disposed on the main support, the positioning plate can be rotated so that the opening in the positioning plate fits with the positioning member.

In the foregoing embodiments, a decorative part configured to accurately define a position of the camera may also be disposed on the camera.

Reference signs are described as follows: 10: main support: 11: mounting space: 12: connection plate: 13: positioning post: 14: second positioning hole: 15: positioning member: 20: first steel sheet: 21: first steel sheet body: 22: bearing piece: 220: hole: 23: first connection piece: 24: first limit plate: 25: second limit plate: 26: folded edge: 30: camera assembly: 31: elastic connection piece: 32: camera: 33: first connector: 40: fixation assembly: 41: adapting circuit board: 410: second connector: 411: through hole: 42: second steel sheet: 420: limit piece: 421: positioning piece: 422: positioning hole: 423: positioning plate: 424: opening: and 425: protruding portion.

DESCRIPTION OF EMBODIMENTS

To make objectives, technical solutions and advantages of this application clearer, the following further describes in detail this application with reference to the accompanying drawings.

During development of the mobile phone industry, to improve photographing performance of mobile phones, use of combinations of multiple cameras has been consensus of manufacturers who are adopting three-camera, four-camera, and even five-camera solutions. As to charging speeds, chargers have been developed from 5 W to 40 W, even above 100 W, and accordingly, charging time has been shortened from 4 to 5 hours to within 1 hour, even within 30 minutes. A camera is connected to a printed circuit board (PCB) through board-to-board connection, and then they are pressed together using an injection-molded support to prevent the board-to-board connector from going loose during use. However, with the increase of cameras, it is difficult to mount the cameras if they are located inside the foregoing manner. In addition, when a mobile phone has a fast charging function, board-to-board connectors of a battery will constantly increase. However, the board-to-board connectors of the battery and board-to-board connectors of at least one camera are all located at a lower portion of a printed circuit board, which results in shortage of space in the downside region of the mainboard, so that the need of mounting cannot be satisfied. Therefore, it is necessary to compromise the charging speed or reduce the number of cameras to satisfy the need of mounting.

In view of this problem, this application provides an electronic device which can satisfy the need of mounting without reduction of the definition of photographs and fast charging performance.

Terms used in the following embodiments are merely intended to describe specific embodiments, but are not intended to limit this application. As used in the specification of this application and the appended claims, singular expression forms "one", "a", "the", "this", "that" and "this one" are intended to also include expressions such as "one or more", unless otherwise specified in the context.

Reference to "an embodiment" or "some embodiments" or the like described in this specification means that one or more embodiments of this application include a specific feature, structure, or characteristic described with reference to that embodiment. Therefore, expressions such as "in an embodiment", "in some embodiments", and "in some other embodiments" appearing in different places in this specification do not necessarily refer to a same embodiment, but mean "one or more but not all embodiments", unless otherwise specially noted. The terms "include", "comprise", and "have", and variants thereof all mean "including but not limited to", unless otherwise specially noted.

Figure 1:
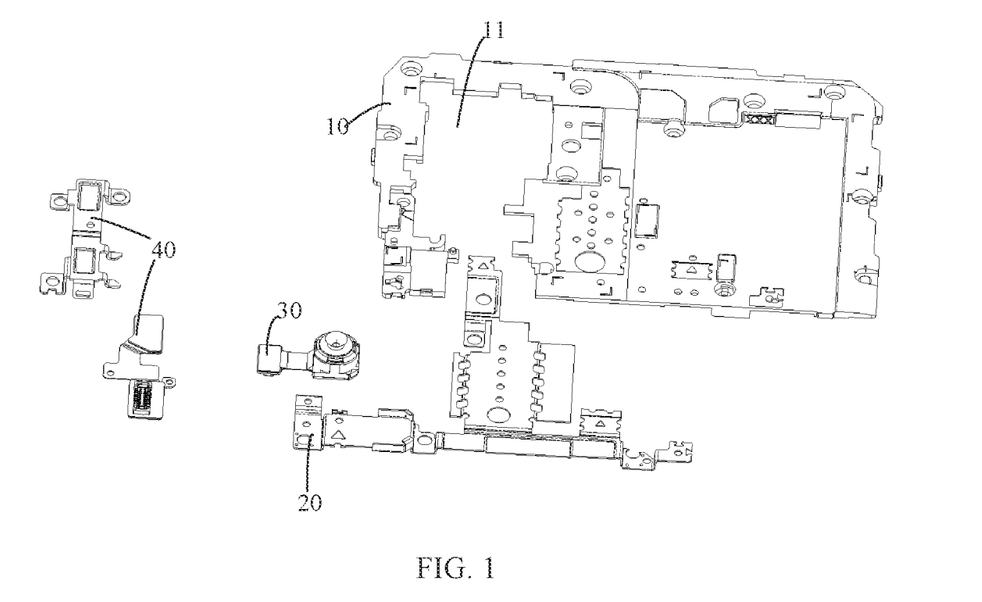
FIG. 1 is an exploded view of an electronic device according to an embodiment of this application.

Referring to FIG. 1, this application provides an electronic device. The electronic device includes a main support 10, a first steel sheet 20, a camera assembly 30, and a fixation assembly 40. The main support 10 is provided with a mounting space 11, and the main support 10 is provided with a first face and a second face that face opposite directions. The first steel sheet 20 is mounted to the first face of the main support 10 and provided with a mounting portion located inside the mounting space. The camera assembly 30 is mounted in the mounting portion. The fixation assembly 40 is mounted to the second face of the main support 10 to fix the camera assembly 30 in the mounting portion, and the fixation assembly 40 is connected to the camera assembly. A gap is left between the mounting portion and the first face of the main support 10. Provision of the gap can increase interior space (longitudinal space) of the electronic device. During specific disposition of components, a board-to-board connector may be disposed in the gap to satisfy the need of mounting of components. With such design, it is only necessary to extend the camera assembly outwards for some distance without the need to increase transverse space of the electronic device.

It should be noted that, to increase convenience of disposition of components, the mounting portion may be disposed in a position that is close to a part where a battery is mounted, so that an additional board-to-board connector fitting with the battery can be conveniently mounted in the gap.

Figure 2:
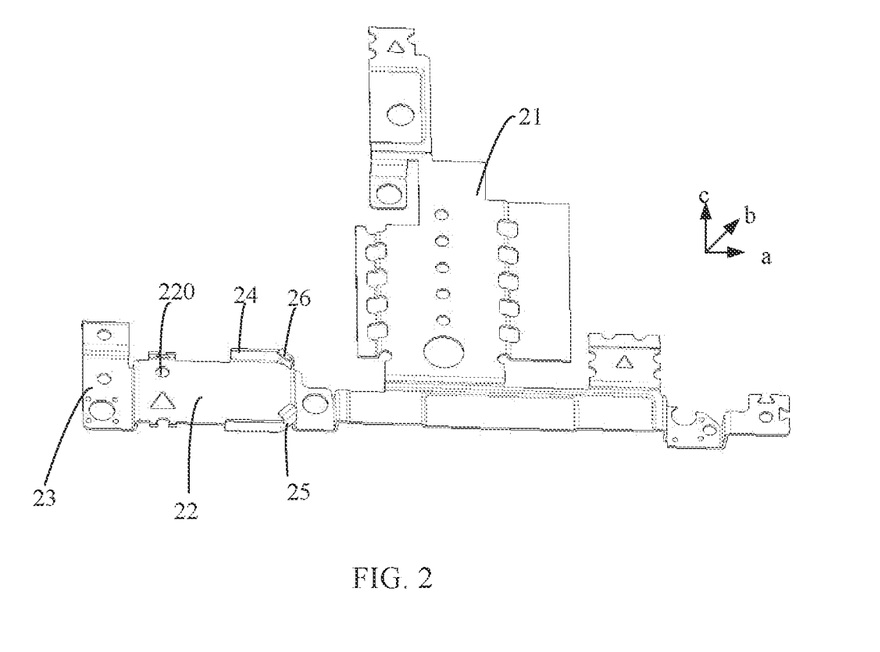
FIG. 2 is a schematic structural diagram of a main support of an electronic device according to an embodiment of this application.
Figure 3:
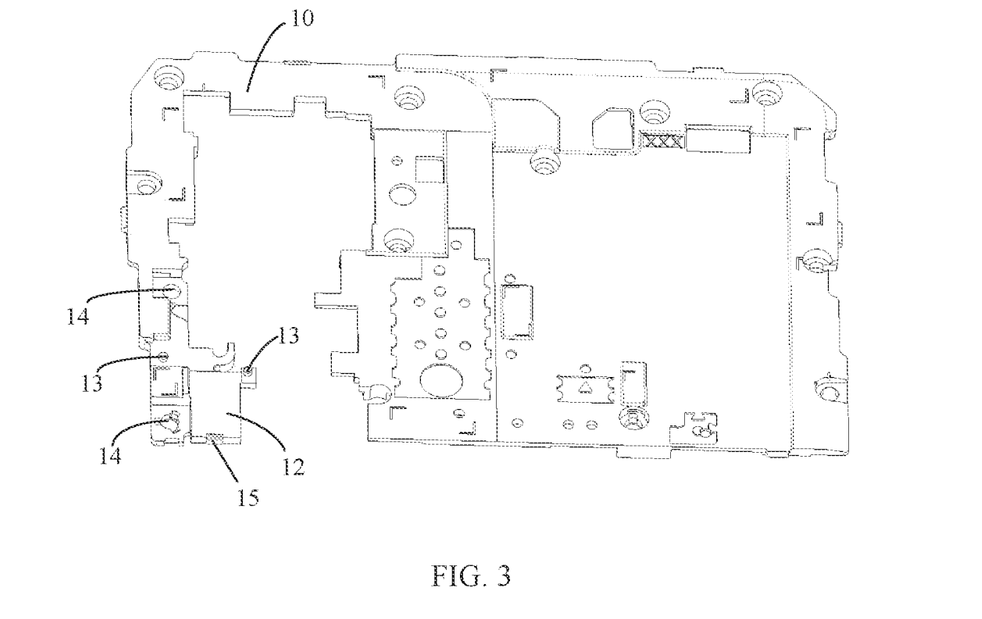
FIG. 3 is a schematic structural diagram of a first steel sheet in an electronic device according to an embodiment of this application.
Figure 4:
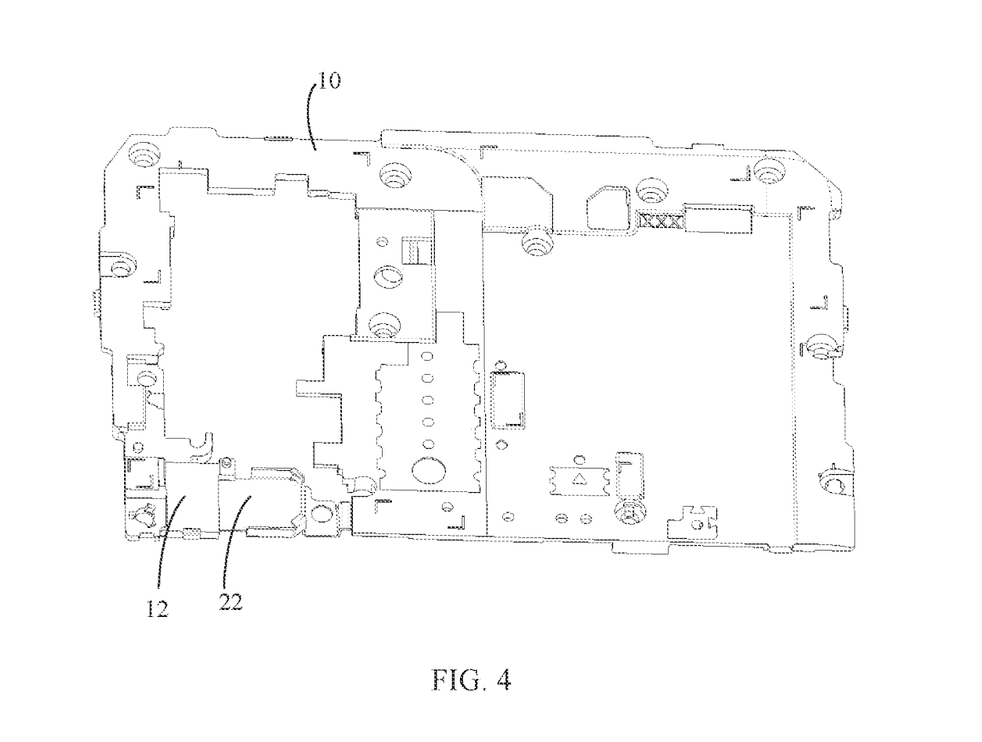
FIG. 4 is a schematic structural diagram of a first steel sheet being mounted to a main support of an electronic device according to an embodiment of this application.

In an embodiment, referring to FIG. 2, FIG. 3, and FIG. 4, the first steel sheet may include a first steel sheet body 21, a bearing piece 22, and a first connection piece 23. Both the first steel sheet body 21 and the first connection piece 23 are connected to the first face of the main support 10, where the first steel sheet body 21 and the first connection piece 23 are located at two sides of the mounting space 11. Two ends of the bearing piece 22 are connected to the first connection piece 23 and the first steel sheet body 21, respectively. The bearing piece 22 protrudes away from the first face of the main support 10, so that a gap is left between the bearing piece 22 and a plane on which the first face of the main support 10 is located. This gap may be configured to mount a board-to-board connector. Specifically, to connect the first connection piece 23 to the main support 10, a connection plate 12 may be disposed on the main support 10, and the first connection piece 23 is connected to a first face of the connection plate 12 (that is, the first face of the main support 10). To make the first steel sheet more securely mounted to the main support 10, a plurality of holes may be provided in the first connection piece 23, and an adhesive may be disposed in the holes and adhered to the first face of the connection plate 12. In addition, a hole 220 may also be provided in the bearing piece 22, so as to increase an adhesion area between the first steel sheet and the main support, making the adhesion more secured.

It should be noted that the hole 220 may be triangular or circular, or the like, which is not limited herein.

In an embodiment, the mounting portion may include a bearing piece 22 and a first limit plate 24 and a second limit plate 25 that are disposed on the bearing piece 22. The first limit plate 24 and the second limit plate 25 extend towards an end away from the first face of the main support 10. The first limit plate 24 and the second limit plate 25 may be disposed at an edge of the bearing piece 22. A folded edge 26 may be disposed on the second limit plate 25, and the folded edge 26 is folded towards the center of the bearing piece 22. When the camera assembly is mounted in the mounting portion, the first limit plate 24 and the second limit plate 25 can inhibit movement of the camera assembly in a first direction (direction b in FIG. 2) and a second direction (direction a in FIG. 2), and the folded edge 26 can inhibit movement of the camera assembly in a third direction (direction c in FIG. 2), where the first direction and the second direction may be a transverse direction and a longitudinal direction in a horizontal plane, and the third direction is a direction perpendicular to the first direction and the second direction.

It should be noted that the folded edge 26 may alternatively be disposed on the second limit plate 25, or the folded edge 26 may be disposed on both the first limit plate 24 and the second limit plate 25.

Figure 5:
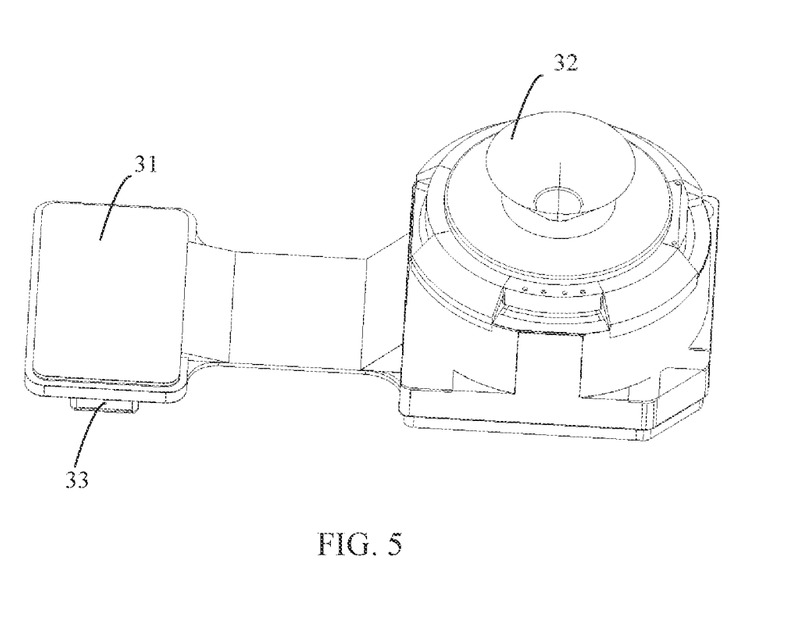
FIG. 5 is a schematic structural diagram of a camera assembly of an electronic device according to an embodiment of this application.

In the foregoing embodiments, referring to FIG. 5, the camera assembly 30 may include a camera 32 and an elastic connection piece 31, where the elastic connection piece 31 has a first end and a second end. The camera 32 is mounted at the first end of the elastic connection piece 31, and the first end of the elastic connection piece 31 may be disposed on the mounting portion of the bearing piece. In this case, the camera 32 will experience limitation in the first direction, second direction, and third direction, so as to initially define a position of the camera 32. A first connector 33 is disposed at the second end of the elastic connection piece 31. The first connector 33 faces the second face of the main support and may be connected to the fixation assembly, so that the camera can be connected to another component, where the second end of the elastic connection piece 31 is disposed on the connection plate.

Figure 6A:
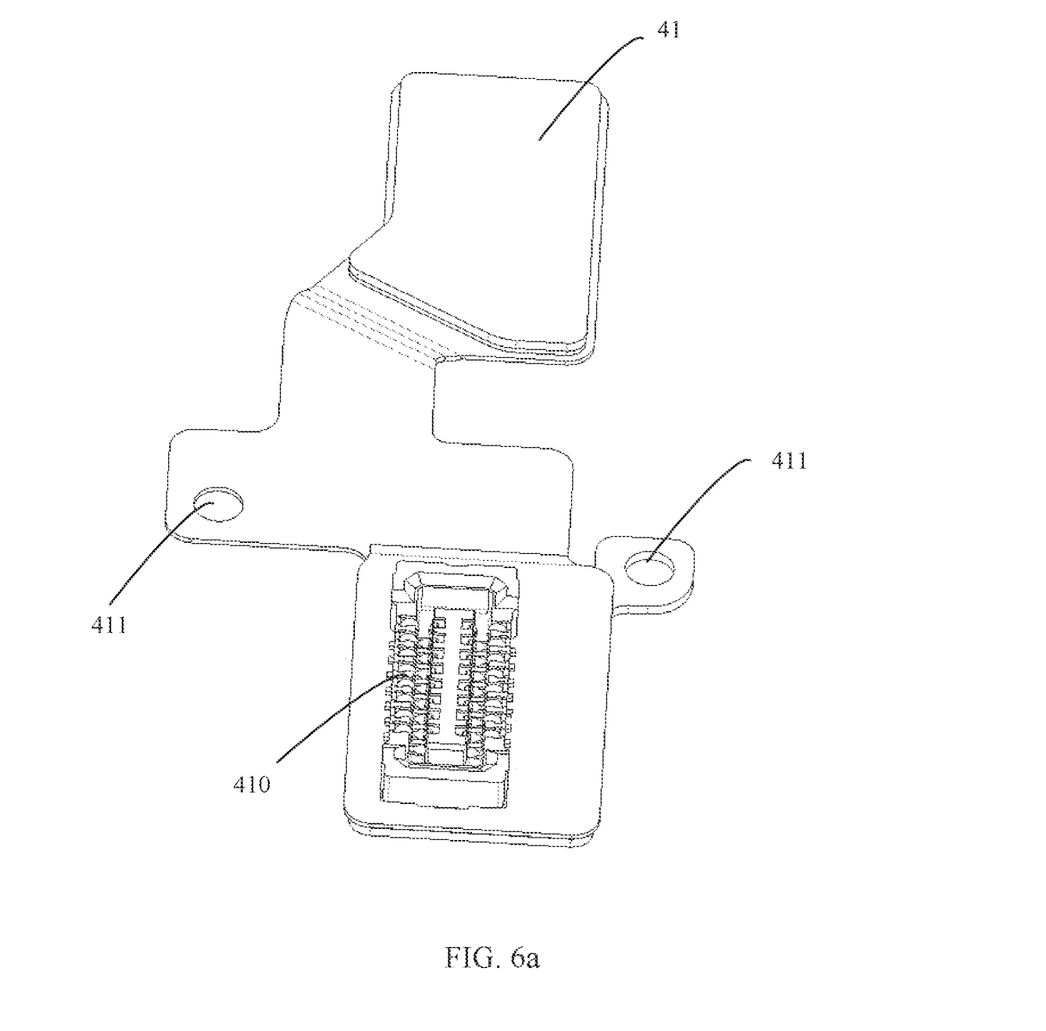
FIG. 6*a* is a schematic structural diagram of an adapting circuit board of an electronic device according to an embodiment of this application.
Figure 6B:
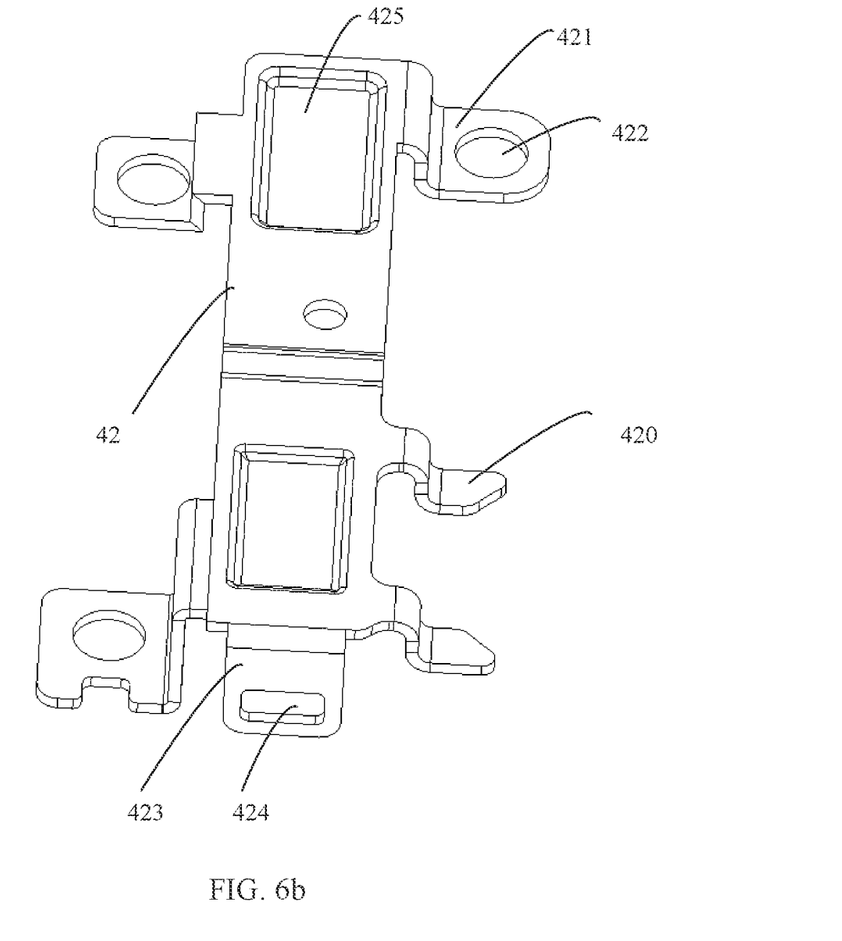
FIG. 6*b* is a schematic structural diagram of a second steel sheet in an electronic device according to an embodiment of this application.
Figure 7:
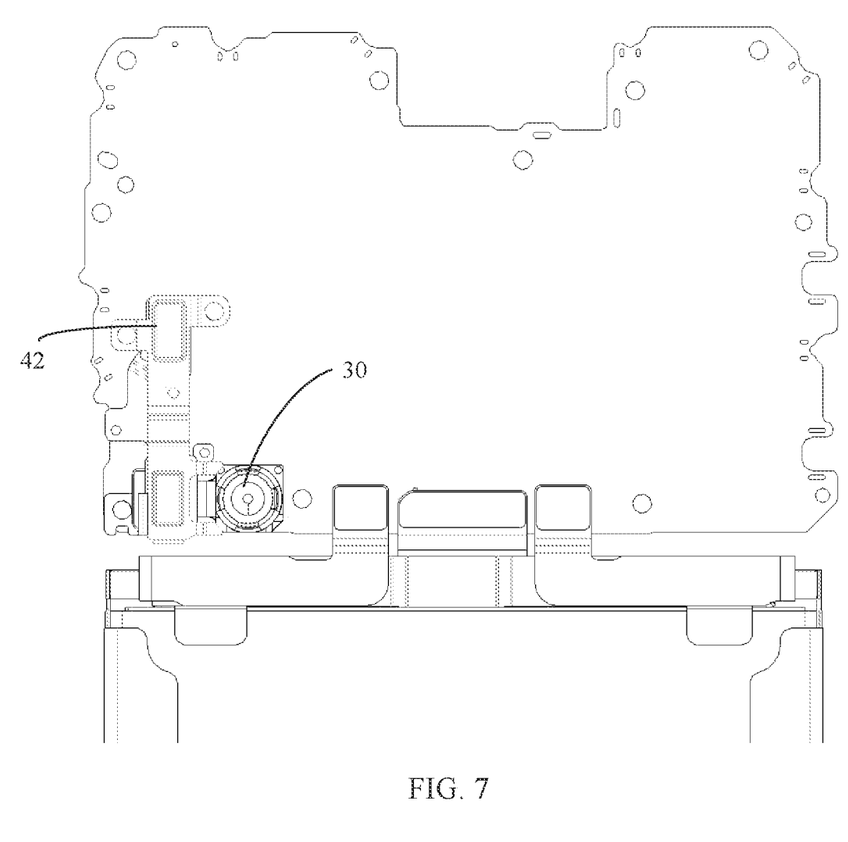
FIG. 7 is a schematic structural diagram 1 of an electronic device according to an embodiment of this application.
Figure 8:
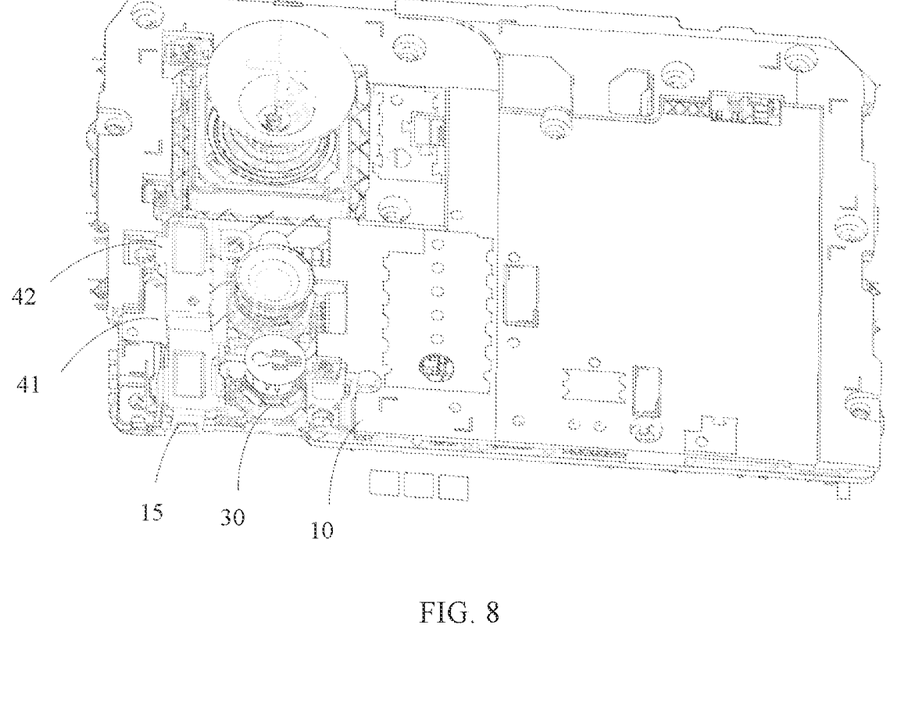
FIG. 8 is a schematic structural diagram 2 of an electronic device according to an embodiment of this application.

In an embodiment, referring to FIG. 6a and FIG. 6b, to fix the camera assembly and connect the camera assembly to another component, the fixation assembly may include an adapting circuit board 41 and a second steel sheet 42, where a first end of the adapting circuit board 41 is disposed on the second face of the main support and is located between the second face of the main support and the second end of the elastic connection piece. A second connector 410 fitting with the first connector is disposed at a side facing the elastic connection piece of the first end of the adapting circuit board 41, thereby guaranteeing steady running of the camera disposed at the first end of the elastic connection piece. In addition, a board-to-board connector connected to the mainboard may also be disposed at the second end of the adapting circuit board 41.

To conveniently mount the adapting circuit board to the main support, still referring to FIG. 6a and FIG. 3, a plurality of positioning posts 13 may be disposed on the main support 10. The adapting circuit board 41 may be provided with through holes 411, where the through holes 411 are located at two sides of the adapting circuit board 41, and the positioning posts 13 on the main support 10 run through the through holes 411, so as to define a position of the adapting circuit board 41 on the main support 10 and prevent the adapting circuit board 41 from joggling.

In the foregoing embodiments, the second steel sheet 42 may include a second steel sheet body and a limit piece 420. The limit piece 420 is disposed at a side of the second steel sheet body facing the camera and may abut against the camera, so as to fix a position of the camera in the mounting portion and prevent the camera from joggling in the mounting portion in a direction reverse to the first direction.

Specifically, the limit piece 420 may include a plugging portion and an abutting portion. One end of the abutting portion is connected to a side of the second steel sheet body facing the camera, and the other end of the abutting portion is connected to the plugging portion. The plugging portion may be perpendicular to the abutting portion. The plugging portion may be plugged below the camera, or a socket fitting with the plugging portion is provided in the camera, so that the abutting portion is able to abut against the camera, making the camera unable to move in a direction reverse to the first direction.

In a specific implementation, still referring to FIG. 6b, FIG. 7, FIG. 8 and FIG. 3, a first end of the second steel sheet body and a second end of the adapting circuit board 41 may be pressed together, and a second end of the second steel sheet body and the second end of the elastic connection piece may be pressed together, thereby ensuring that the camera is unable to joggle after being mounted. In addition, to make the second steel sheet body securely mounted to the main support 10 after the adapting circuit board 41 and the elastic connection piece are pressed together with the second steel sheet body, a positioning piece 421 may be disposed at both the first end and the second end of the second steel sheet body, and a first positioning hole 422 is provided in each positioning piece 421. The main support 10 is provided with second positioning holes 14 that fit with the first positioning holes 422. The second steel sheet body is fixed to the main support 10 by, for example, a screw or a rivet, so as to lock the camera assembly.

It should be noted that there may be two positioning pieces 421 disposed at the first end of the second steel sheet body, and the two positioning pieces 421 located at the first end of the second steel sheet body are disposed at two sides of the second steel sheet body, so as to secure the connection of the first end of the second steel sheet body to the main support 10. In addition, there may be one positioning piece 421 disposed at the second end of the second steel sheet body, and the one positioning piece 421 is disposed at a side away from the camera. With the one positioning piece 421 and the limit piece 420, the second end of the second steel sheet body can be secured to the main support 10.

In addition, because the first end and the second end of the second steel sheet body are pressed together with the second end of the adapting circuit board 41 and the second end of the elastic connection piece, respectively, to improve a joining effect, a protruding portion 425 facing the first face of the main support 10 may be disposed at both the first end and the second end of the second steel sheet body. The protruding portion 425 located at the first end of the second steel sheet body abuts against the second end of the adapting circuit board 41 to press the second end of the adapting circuit board 41 tight. The protruding portion 425 located at the second end of the second steel sheet body abuts against the second end of the elastic connection piece to press the camera assembly tight on the connection plate 12. Provision of the two protruding portions 425 can improve an effect of pressing the adapting circuit board 41 and the camera assembly 30 tight by the second steel sheet body.

To make the second steel sheet body more securely mounted to the main support 10, a positioning plate 423 may be disposed on an end face of the second end of the second steel sheet body, with an opening 424 provided in the positioning plate 423, where the positioning plate 423 may be a flexible plate so that the positioning plate 423 is able to rotate relative to the second steel sheet body. A positioning member 15 fitting with the opening 424 is disposed on a side face of the main support 10. When the second steel sheet body is being disposed on the main support 10, the positioning plate 423 can be rotated so that the opening 424 in the positioning plate 423 fits with the positioning member 15.

In the foregoing embodiments, a decorative part configured to accurately define a position of the camera may also be disposed on the camera.

The electronic device may specifically be any one of a mobile phone, a tablet computer, a notebook computer, and a smart wearable device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
    a main support, wherein the main support is provided with a mounting space;
    a first steel sheet, wherein the first steel sheet is mounted to a first face of the main support, and the first steel sheet is provided with a mounting portion that is located inside the mounting space, with a gap left between the mounting portion and the first face of the main support;
    a camera assembly, wherein the camera assembly is disposed in the mounting portion; and
    a fixation assembly, wherein the fixation assembly is mounted to a second face of the main support and connected to the camera assembly to fix the camera assembly;
    wherein the first steel sheet comprises a first steel sheet body, a bearing piece, and a first connection piece; and
    wherein the first connection piece and the first steel sheet body are connected to the first face of the main support and located at two sides of the mounting space, two ends of the bearing piece are connected to the first connection piece and the first steel sheet body, respectively, and the bearing piece protrudes away from the first face of the main support to form the gap.

2. The electronic device according to claim 1, wherein the bearing piece is provided with a first limit plate and a second limit plate extending away from the first face of the main support, and the first limit plate and the second limit plate are configured to inhibit movement of the camera assembly in a first direction and a second direction.

3. The electronic device according to claim 2,
    wherein a folded edge facing towards an axis of the bearing piece is provided on the first limit plate and/or the second limit plate, and the folded edge is configured to inhibit movement of the camera assembly in a third direction; and wherein the mounting portion is formed by the bearing piece, the folded edge, the first limit plate, and the second limit plate.

4. The electronic device according to claim 1, wherein the camera assembly comprises an elastic connection piece and a camera, wherein the camera is disposed at a first end of the elastic connection piece;

wherein the first end of the elastic connection piece is disposed on the mounting portion, and a second end of the elastic connection piece is connected to the second face of the main support; and wherein a first connector disposed is at the second end of the elastic connection piece facing towards the second face of the main support.

5. The electronic device according to claim 4, wherein the fixation assembly comprises an adapting circuit board and a second steel sheet; and wherein a first end of the adapting circuit board is mounted to the second face of the main support and provided with a second connector fitting with the first connector, and the second steel sheet is configured to fix the adapting circuit board and the camera assembly.

6. The electronic device according to claim 5, wherein through holes are provided in two sides of the adapting circuit board, and positioning posts fitting with the through holes are disposed on the main support.

7. The electronic device according to claim 5, wherein the second steel sheet comprises a second steel sheet body and a limit piece, and the limit piece is connected to a side face of the second steel sheet body and configured to abut against the camera so as to fix the camera.

8. The electronic device according to claim 7, wherein a first end of the second steel sheet body and a second end of the adapting circuit board are pressed together, and a second end of the second steel sheet body and the second end of the elastic connection piece are pressed together; and wherein a positioning piece is disposed at both the first end and the second end of the second steel sheet body and provided with a first positioning hole, and the main support is provided with second positioning holes that fit with the first positioning holes.

9. The electronic device according to claim 8, wherein a positioning member is disposed on a side face of the main support, and the second steel sheet body is provided with a positioning plate that fits with the positioning member, wherein the positioning plate is provided with an opening that fits with the positioning member.

10. The electronic device according to claim 4, wherein the camera is provided with a decorative part that is configured to define a position of the camera.

11. An electronic device, comprising:

a main support, wherein the main support is provided with a mounting space;

a first steel sheet, wherein the first steel sheet is mounted to a first face of the main support, and the first steel sheet is provided with a mounting portion that is located inside the mounting space, with a gap left between the mounting portion and the first face of the main support;

a camera assembly, wherein the camera assembly is disposed in the mounting portion; and a fixation assembly, wherein the fixation assembly is mounted to a second face of the main support and connected to the camera assembly to fix the camera assembly;

wherein the camera assembly comprises an elastic connection piece and a camera, wherein the camera is disposed at a first end of the elastic connection piece;

wherein the first end of the elastic connection piece is disposed on the mounting portion, and a second end of the elastic connection piece is connected to the second face of the main support; and wherein a first connector disposed is at the second end of the elastic connection piece facing towards the second face of the main support.

12. The electronic device according to claim 11, wherein the fixation assembly comprises an adapting circuit board and a second steel sheet; and wherein a first end of the adapting circuit board is mounted to the second face of the main support and provided with a second connector fitting with the first connector, and the second steel sheet is configured to fix the adapting circuit board and the camera assembly.

13. The electronic device according to claim 12, wherein through holes are provided in two sides of the adapting circuit board, and positioning posts fitting with the through holes are disposed on the main support.

14. The electronic device according to claim 12, wherein the second steel sheet comprises a second steel sheet body and a limit piece, and the limit piece is connected to a side face of the second steel sheet body and configured to abut against the camera so as to fix the camera.

15. The electronic device according to claim 14, wherein a first end of the second steel sheet body and a second end of the adapting circuit board are pressed together, and a second end of the second steel sheet body and the second end of the elastic connection piece are pressed together; and wherein a positioning piece is disposed at both the first end and the second end of the second steel sheet body and provided with a first positioning hole, and the main support is provided with second positioning holes that fit with the first positioning holes.

16. The electronic device according to claim 15, wherein a positioning member is disposed on a side face of the main support, and the second steel sheet body is provided with a positioning plate that fits with the positioning member, wherein the positioning plate is provided with an opening that fits with the positioning member.

17. The electronic device according to claim 11, wherein the camera is provided with a decorative part that is configured to define a position of the camera.

* * * * *

UNITED STATES PATENT AND TRADEMARK OFFICE
CERTIFICATE OF CORRECTION

| | | |
|---|---|---|
| PATENT NO. | : 12,506,824 B2 | Page 1 of 1 |
| APPLICATION NO. | : 17/800826 | |
| DATED | : December 23, 2025 | |
| INVENTOR(S) | : Li et al. | |

It is certified that error appears in the above-identified patent and that said Letters Patent is hereby corrected as shown below:

On the Title Page

Page 2, Foreign Patent Documents, Citation 8: "IN 107105573 A 8/2017" should read -- CN 107105573 A 8/2017 --.

Signed and Sealed this
Third Day of February, 2026

John A. Squires
*Director of the United States Patent and Trademark Office*